No. 704,609. Patented July 15, 1902.
W. P. BARTEL.
LACING HOOK.
(Application filed Dec. 26, 1901.)
(No Model.)
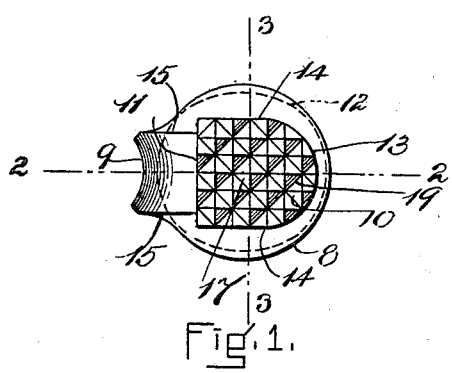
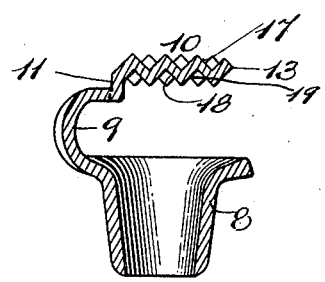
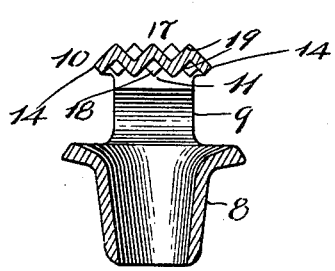
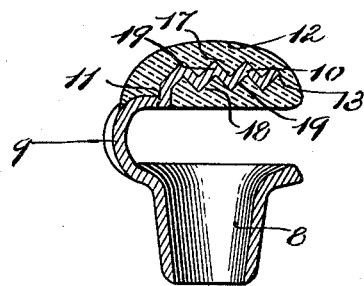
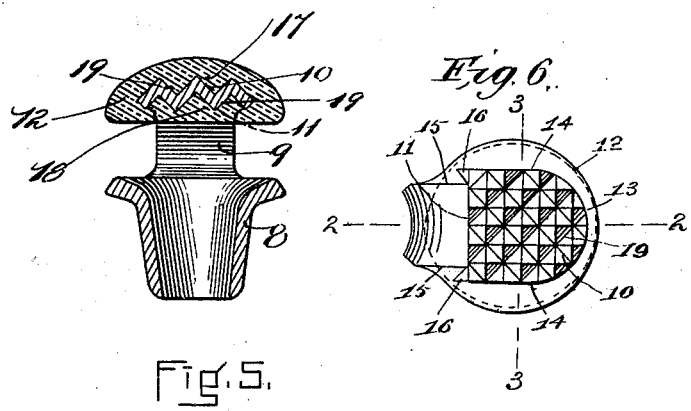
WITNESSES:
Louis A. Jones.
Sydney E. Taft.
INVENTOR:
William P. Bartel.
by his Attorney,
THE NORRIS PETERS CO., PHOTO-LITHO., WASHINGTON, D. C.

UNITED STATES PATENT OFFICE.

WILLIAM P. BARTEL, OF WALTHAM, MASSACHUSETTS.

LACING-HOOK.

SPECIFICATION forming part of Letters Patent No. 704,609, dated July 15, 1902.

Application filed December 26, 1901. Serial No. 87,196. (No model.)

*To all whom it may concern:*

Be it known that I, WILLIAM P. BARTEL, a citizen of the United States, residing at Waltham, in the county of Middlesex and State of Massachusetts, have invented new and useful Improvements in Lacing-Hooks, of which the following is a specification.

This invention relates to lacing-hooks for boots and shoes, and particularly to that class of lacing-hooks in which the head is covered with a plastic material for the purpose of preventing the metal portion of the head from wearing and presenting an unsightly appearance upon the shoe.

The invention consists in the novel construction and formation of the metal head hereinafter described and claimed, whereby the plastic material molded thereon is prevented from being accidentally detached therefrom.

The invention also consists in the combination and arrangement of parts set forth in the following specification and particularly pointed out in the claims thereof.

Referring to the drawings, Figure 1 is a plan view of my improved lacing-hook before the plastic material is molded upon the head thereof, the outline of the plastic material being shown in dotted lines. Fig. 2 is a section taken on line 2 2 of Fig. 1. Fig. 3 is a transverse section taken on line 3 3 of Fig. 1. Fig. 4 is a view similar to Fig. 2, showing the covering of plastic material molded thereon. Fig. 5 is a view similar to Fig. 3, also showing the plastic material molded thereon. Fig. 6 is a plan view of a modified form of my improved lacing-hook before the plastic material is molded upon the head thereof, the outline of the plastic material being shown in dotted lines.

Like numerals refer to like parts throughout the several views of the drawings.

In the drawings, 8 is the shank of the lacing-hook, whereby said lacing-hook is attached to the leather of a boot or shoe by driving the same therethrough and clenching it thereon, as is well known to those skilled in the art.

9 is the neck, and 10 the metal head, of the lacing-hook. At the line where the neck and head are joined together said neck is bent upwardly to form a vertical shoulder 11 for the purpose of preventing the plastic material 12 from being accidentally detached from the head 10, said shoulder also serving to raise the corrugated head portion 10 to a point midway between the top and bottom of the plastic covering 12 molded thereon, so that the lower face of said plastic covering is flush with the lower face of the upper portion of the neck, forming a smooth surface from the curved inner portion of the neck to the front of the head of the lacing-hook, as shown in Fig. 4.

The head 10 is formed with a rounded front end 13 and with sides 14 14 substantially parallel to each other, said sides being joined to the sides 15 15 of the neck 9 by two horizontal shoulders 16, said shoulders standing substantially at right angles to the sides 14 and 15 and serving the same purpose as the vertical shoulder 11. If desirable, the shoulders 16 may be formed at an acute angle with the sides 14 and 15, as shown in dotted lines, Fig. 1, and as shown in Fig. 6. When the shoulders 16 are formed at an acute angle with the sides 14 15, they constitute a very desirable means for holding the plastic material molded upon the head firmly thereon, acting as hooks to prevent said material from slipping either forwardly or sidewise of the head of the lacing-hook.

The upper face 17 and the lower face 18 of the head 10 are provided with corrugations 19, struck up therein by means of dies, said corrugations being formed by two sets of parallel cuts intersecting each other at an angle.

It will be seen that by the hereinbefore-described construction the molded covering 12 is firmly held against accidental displacement upon the head 10 by the corrugations 19, the horizontal shoulders 16, and the vertical shoulder 11, the whole structure forming a very strong and durable lacing-hook.

It is evident that the corrugations 19 may be formed upon the upper face 17 or upon the lower face 18, or upon both the upper face 17 and the lower face 18 of the head 10.

Having thus described my invention, what I claim, and desire by Letters Patent to secure, is—

1. A lacing-hook formed of a single piece of metal, comprising a shank, a neck extending therefrom, a head having corrugations extending over the entire upper and lower faces thereof, and a covering of plastic material molded around said head and entirely covering the same above and below.

2. A lacing-hook formed of a single piece of metal, comprising a shank, a neck, a head having two sets of corrugations formed therein by two sets of parallel cuts intersecting each other at an angle and extending over the entire upper and lower faces thereof, and a covering of plastic material molded around said head and entirely covering the same above and below.

3. A lacing-hook formed of a single piece of metal, comprising a shank, a neck extending therefrom, a head having corrugations extending entirely over one face thereof, and a covering of plastic material molded around said head.

4. A lacing-hook formed of a single piece of metal, comprising a shank, a neck, a head, said neck bent upwardly to form a vertical shoulder near the line where said neck and head are joined together, said vertical shoulder extending transversely across said neck, and a covering of plastic material molded around said head and shoulder and entirely covering the same above and below.

5. A lacing-hook formed of a single piece of metal, comprising a shank, a neck, and a head, said head projecting beyond said neck and forming, at the line where said head and neck are joined together, two horizontal rearwardly-extended shoulders and a covering of plastic material molded around said head and shoulders.

6. A lacing-hook formed of a single piece of metal, comprising a shank, a neck, and a head, said neck bent upwardly to form a vertical shoulder near the line where said neck and head are joined together, said vertical shoulder extending transversely across said neck, and said head projecting beyond said neck and forming, at the line where said head and neck are joined together, two horizontal shoulders and a covering of plastic material molded around said head and shoulders.

7. A lacing-hook formed of a single piece of metal, comprising a shank, a neck, and a head, said neck bent upwardly to form a vertical shoulder near the line where said neck and head are joined together, said vertical shoulder extending transversely across said neck and said head projecting beyond said neck and forming, at the line where said neck and head are joined together, two horizontal rearwardly-extended shoulders and a covering of plastic material molded around said head and shoulders.

In testimony whereof I have hereunto set my hand in presence of two subscribing witnesses.

WILLIAM P. BARTEL.

Witnesses:
CHARLES S. GOODING,
ANNIE J. DAILEY.